United States Patent
Barnes et al.

(10) Patent No.: US 11,814,188 B2
(45) Date of Patent: Nov. 14, 2023

(54) FUEL DRAIN ENGAGEMENT TOOL

(71) Applicant: Gulfstream Aerospace Corporation, Savannah, GA (US)

(72) Inventors: Jeffery Barnes, Savannah, GA (US); Patrick Leonard, Savannah, GA (US); John Hume, Savannah, GA (US)

(73) Assignee: Gulfstream Aerospace Corporation

( * ) Notice: Subject to any disclaimer, the term of this patent is extended or adjusted under 35 U.S.C. 154(b) by 784 days.

(21) Appl. No.: 16/947,201

(22) Filed: Jul. 22, 2020

(65) Prior Publication Data

US 2021/0039803 A1    Feb. 11, 2021

Related U.S. Application Data

(60) Provisional application No. 62/884,506, filed on Aug. 8, 2019.

(51) Int. Cl.

| | |
|---|---|
| *B64D 37/20* | (2006.01) |
| *B64D 37/28* | (2006.01) |
| *F16L 37/00* | (2006.01) |
| *F16L 37/084* | (2006.01) |
| *F16L 37/40* | (2006.01) |
| *F16K 31/44* | (2006.01) |

(52) U.S. Cl.
CPC ............ *B64D 37/20* (2013.01); *B64D 37/28* (2013.01); *F16L 37/008* (2013.01); *F16L 37/0847* (2013.01); *F16L 37/40* (2013.01); *F16K 31/44* (2013.01)

(58) Field of Classification Search
CPC ....... B64D 37/20; B64D 37/28; F16L 37/008; F16L 37/0847; F16L 37/40; F16K 31/44

USPC ......................................................... 141/392
See application file for complete search history.

(56) References Cited

U.S. PATENT DOCUMENTS 4,453,579 A * 6/1984 Gould .................... B64F 5/30
141/387

FOREIGN PATENT DOCUMENTS

| CN | 102431655 A | 5/2012 |
| CN | 206407166 U | 8/2017 |
| CN | 207809811 U | 9/2018 |
| EP | 3272654 A1 | 1/2018 |

OTHER PUBLICATIONS

Eagelman, Joshua, U.S. Appl. No. 16/443,295, filed Jun. 17, 2019.

* cited by examiner

*Primary Examiner* — Timothy P. Kelly
*Assistant Examiner* — Christopher M Afful
(74) *Attorney, Agent, or Firm* — LK Global | Lorenz & Kopf, LLP

(57) ABSTRACT

A fuel drain engagement tool and a method for draining fuel from a fuel tank are provided. In one example, a fuel drain engagement tool includes a housing. An engagement mechanism is coupled with the housing and extending upward therefrom. The engagement mechanism is configured to engage a fuel drain valve and to move between a contracted state and an expanded state. A compression applicator is coupled with the housing and is positioned to engage the engagement mechanism when the compression applicator is compressed to apply a force to the engagement mechanism that causes the engagement mechanism to move from the expanded state to the contracted state.

19 Claims, 8 Drawing Sheets

FIG. 2C   FIG. 2D

FUEL DRAIN ENGAGEMENT TOOL

CROSS-REFERENCE TO RELATED APPLICATIONS

This application is related to and claims all available benefit of U.S. Provisional Patent Application 62/884,506 filed Aug. 8, 2019, the entire contents of which are herein incorporated by reference.

TECHNICAL FIELD

The present invention relates generally to an aircraft, and more particularly to a tool that facilitates draining fuel from an aircraft fuel tank.

BACKGROUND

Aircraft fuel tanks are designed to include openings (drains) that permit fuel to be drained from the fuel tanks. In some examples, these openings are controlled (e.g., opened and closed) by valves. In some examples, these valves have a movable component that is configured to move between a closed position and an opened position. When the movable component is in the closed position, the movable component closes the opening and obstructs fuel from passing through the opening. When the movable component is in the opened position, an unobstructed space is created in the opening that permits fuel to flow through the opening.

In some examples, the movable component is biased towards the closed position by a biasing member. In a non-limiting example, the biasing member may include a spring. In order to open the valve and drain the fuel tank, a force must be applied to the movable component that overcomes the force exerted by the biasing member and moves the movable component from the closed position to the opened position. In some examples, the force is applied by an operator using a pressing component. When application of the force is discontinued, the movable component returns to the closed position under the urging of the biasing member.

In some examples, the movable component includes a receptacle that is configured to receive a tip of the pressing component. To open the valve, the tip of the pressing component is first seated in the receptacle by the operator. Once seated, the operator may apply a force on the pressing component in a direction opposite to the direction of the force applied by the biasing member. When the force applied by the operator on the movable component exceeds the force applied by the biasing member on the movable component, the movable component will move to the opened position. The receptacle ensures that the pressing component remains engaged with the movable component throughout the period of time during which force is applied. In one example, the receptacle is configured as a Phillips screw-head to engage with a Phillips screwdriver.

In some examples, the valve may be configured to remain open even after the force is discontinued by the operator. The movable component may be further configured to rotate. An end portion of the movable component disposed opposite the receptacle may be configured with protrusions that are intended to engage with an inner contour/component of the fuel tank. When the operator has moved the movable component to the opened position and fuel begins to drain through the opening, the operator may then twist the movable component in a first direction to enable the protrusions to engage the inner contour/component of the fuel tank. This engagement will retain the movable component in the opened position. The movable component will remain in the opened position until the operator twists the movable component either further in the first direction or in a second direction opposite to the first direction to release the protrusions from engagement with the inner contour/component of the tank. Once that has occurred, the biasing member will move the movable component back to the closed position.

In some examples, the inner contour/component of the fuel tank includes stops that are intended to obstruct movement of the protrusions beyond a predetermined angular position. This is to prevent over-rotation of the movable component and ensure appropriate engagement between the protrusions and the contour/component of the fuel tank. However, the protrusions may be made of a deformable and/or breakable material, such as plastic. If an operator applies too much torque to the movable component via the pressing component, the protrusions may become damaged or may be sheared off entirely. In that event, the movable component can no longer be retained in the opened position and draining fuel from the fuel tank requires the operator to continually apply force to the movable component, potentially causing the operator's hand to be positioned directly in the path of the draining fuel for protracted periods of time. Alternatively, the valve would need to be replaced with a new valve. This is a costly and time-consuming process that renders the aircraft unavailable for service for lengthy periods while the aircraft is flown to a service facility and the repairs are undertaken. These are both undesirable consequences.

Accordingly, it is desirable to provide an improved tool that permits the moveable component to remain in the opened position without the attendant risk of damaging or shearing off the protrusions. Furthermore, other desirable features and characteristics will become apparent from the subsequent summary and detailed description and the appended claims, taken in conjunction with the accompanying drawings and the foregoing technical field and background.

SUMMARY

A fuel drain engagement tool and a method for draining fuel from a fuel tank are provided herein.

In a first non-limiting embodiment, the fuel drain engagement tool includes, but is not limited to, a housing. The fuel drain engagement tool further includes, but is not limited to, an engagement mechanism coupled with the housing and extending upward therefrom. The engagement mechanism is configured to engage a fuel drain valve. The engagement mechanism is further configured to move between a contracted state and an expanded state. The fuel drain engagement tool further includes, but is not limited to, a compression applicator that is coupled with the housing and that is positioned to engage the engagement mechanism when the compression applicator is compressed. The compression applicator is configured to apply a force to the engagement mechanism that causes the engagement mechanism to move from the expanded state to the contracted state when the compression applicator is compressed.

In another non-limiting embodiment, the method includes, but is not limited to, obtaining a fuel drain engagement tool including a housing, an engagement mechanism coupled with the housing and extending upward therefrom. The engagement mechanism is configured to engage a fuel drain valve. The engagement mechanism is further configured to move between a contracted state and an expanded state. A compression applicator is coupled with the housing and positioned to engage the engagement mechanism when the compression applicator is compressed. The compression applicator is configured to apply a force to the engagement mechanism that causes the engagement mechanism to move from the expanded state to the contracted state when the compression applicator is compressed. The method further includes, but is not limited to, applying a force to the compression applicator to move the engagement mechanism to the contracted state. The method further includes, but is not limited to, engaging the fuel drain valve of the fuel tank with the fuel drain engagement tool while continuing to apply the force to the compression applicator. The method further includes, but is not limited to, moving a movable component on the fuel drain valve from a closed position to an opened position with the engagement mechanism of the fuel drain engagement tool while continuing to apply the force to the compression applicator. The method further includes, but is not limited to, discontinuing application of the force to the compression applicator when the movable component has moved to the opened position and releasing the fuel drain engagement tool such that the fuel drain engagement tool remains engaged with the fuel drain valve and maintains the movable component in the opened position.

BRIEF DESCRIPTION OF THE DRAWINGS

The various embodiments will hereinafter be described in conjunction with the following drawing figures, wherein like numerals denote like elements, and wherein:

FIG. 2C illustrates a side perspective view of a biasing element of the poppet valve in accordance with an exemplary embodiment;

FIG. 2D illustrates a top view of a retainer of the poppet valve in accordance with an exemplary embodiment;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A fuel drain engagement tool for engaging a valve on a fuel tank is disclosed herein. The fuel drain engagement tool eliminates the need to twist the movable component and thereby eliminates the risk that the protrusions described above will be sheared off. The fuel drain engagement tool accomplishes this by transferring responsibility for retaining the movable component in the opened position from the movable component itself (via its protrusions) to the fuel drain engagement tool.

Figure 1:
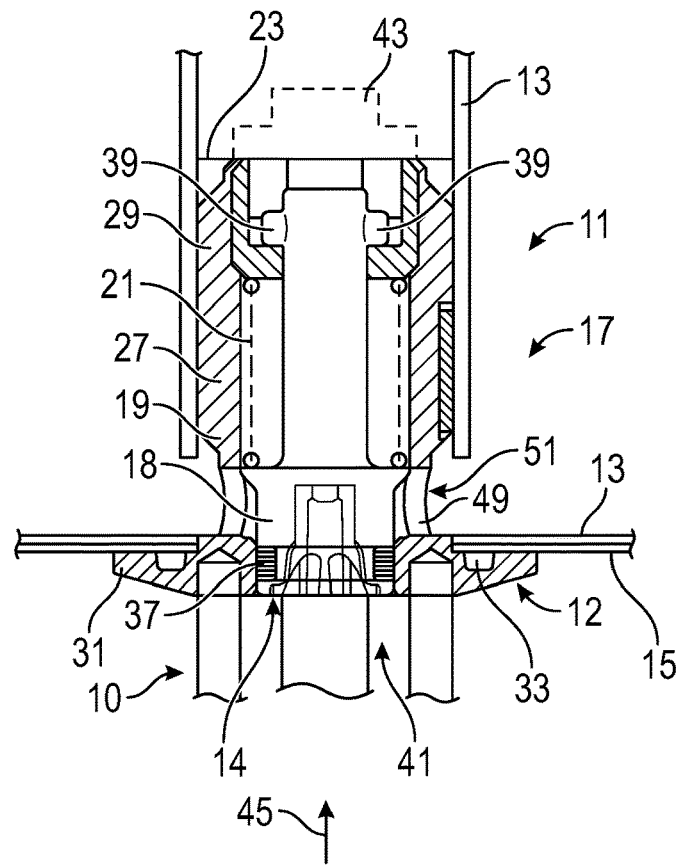
FIG. 1 illustrates a cross-sectional view of a poppet valve in accordance with an exemplary embodiment.

FIG. 1 illustrates a cross-sectional view of a poppet valve 12 that is mounted in a fuel tank wall 13 of a fuel tank 11, for example, of an aircraft, and configured to be actuated by a fuel drain engagement tool 10. The poppet valve 12 is, for example, a fuel drain valve, a water drain valve, or the like. Although the poppet valve 12 is illustrated as being mounted in a fuel tank wall 13 of a fuel tank 11 of an aircraft, it is to be understood that various other embodiments may include the poppet valve 12 mounted to other reservoirs, structures, or the like.

As will be discussed in further detail below, the fuel tank 11 is disposed in an area of the aircraft, e.g., bottom area of the fuselage, wing(s), or the like, surrounded by aircraft skin 15. The fuel tank wall 13 of the fuel tank 11 surrounds a fuel tank cavity 17 (e.g., internal volume) that contains fuel for powering the engine(s) of the aircraft. The engine(s) of the aircraft receive fuel from the fuel tank 11 via a fuel intake (not illustrated). The fuel tank wall 13 includes openings 51 formed adjacent to the poppet valve 12 as will be discussed in further detail below. The fuel tank wall 13 may, for example, be made of a metallic material(s), a polymeric material(s) such as plastic, a composite material(s) including reinforcement fibers (e.g., fiberglass, etc.), and/or the like. In an exemplary embodiment, the fuel tank wall 13 is made of a plastic material. Further, the fuel tank wall 13 may be vented and/or pressurized to allow air to be fluidly communicated to the fuel tank 11 as fuel is being removed from the fuel tank 11 to the engine(s) via the fuel intake.

Figure 2A:
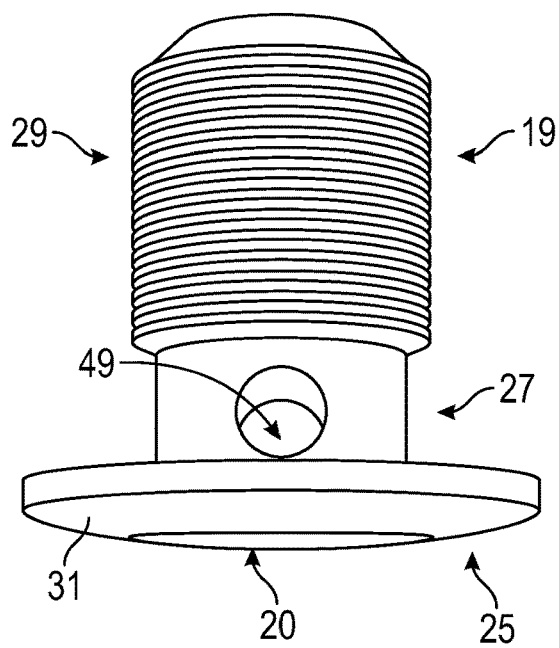
FIG. 2A illustrates a side perspective view of a valve body of the poppet valve in accordance with an exemplary embodiment.
Figure 2B:
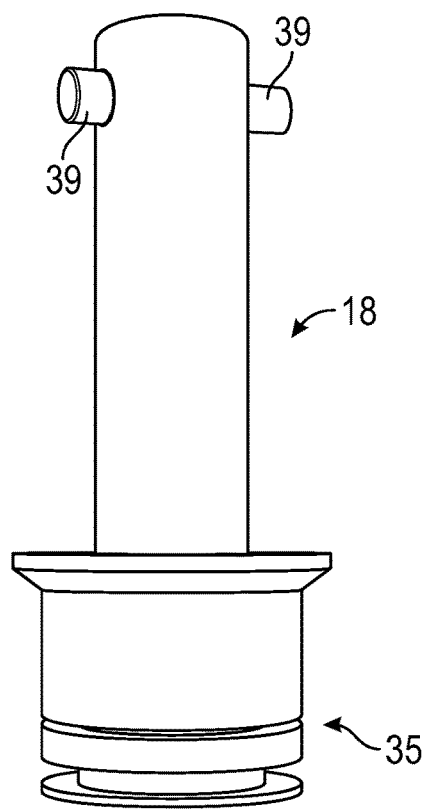
FIG. 2B illustrates a side perspective view of a movable component of the poppet valve in accordance with an exemplary embodiment.
Figure 3:
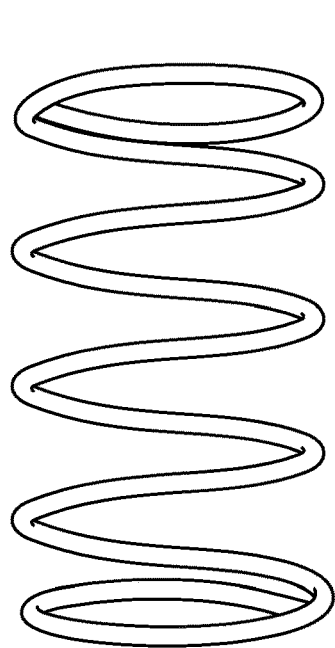
FIG. 3 illustrates a bottom perspective view of the poppet valve mounted on an aircraft in accordance with an exemplary embodiment.
Figure 3:
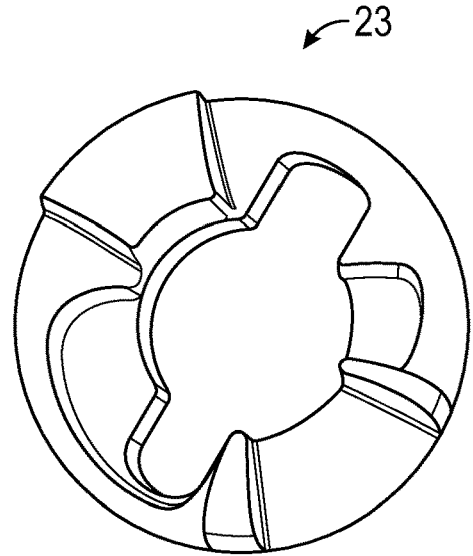
Figure 3:
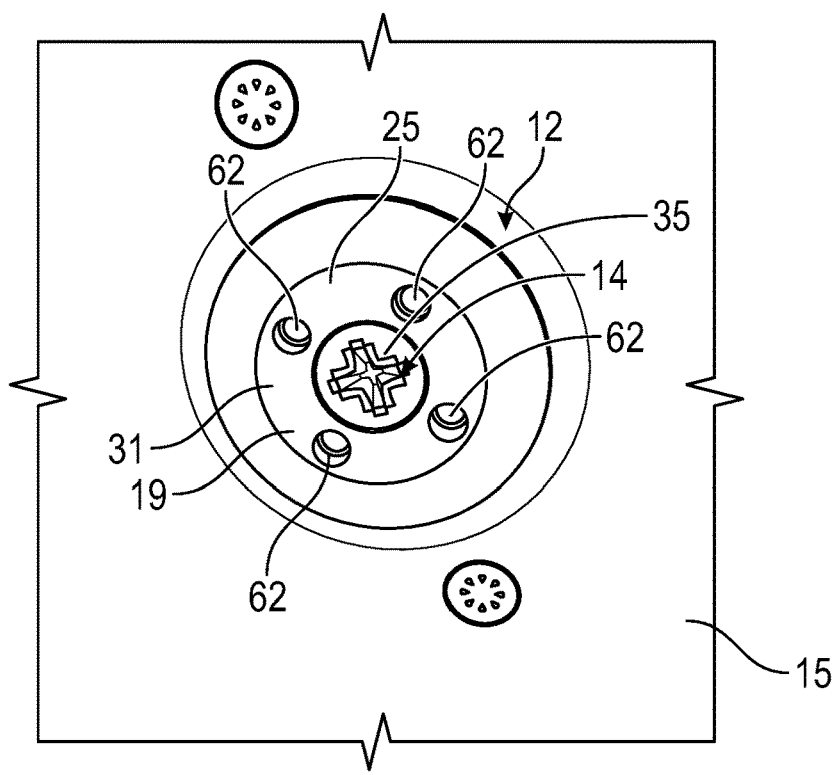

Referring also to FIGS. 2A-3, in an exemplary embodiment, the poppet valve 12 includes a valve body 19, a movable component 18, a biasing element 21 (e.g., spring or the like), and a retainer 23. The valve body 19 houses the movable component 18, the biasing element 21, and the retainer 23. The valve body 19 includes a head portion 25 and a tubular portion 27 that extends distally from the head portion 25. The tubular portion 27 includes a threaded section 29 that engages threads in the fuel tank wall 13 to mount the poppet valve 12 in the fuel tank 11. The tubular portion 27 has openings 49 formed therethrough that are aligned with the openings 51 of the fuel tank wall 13. The head portion 25 of the valve body 19 has a flange 31 and includes an O-ring 33 that is disposed on and/or against the back side of the flange 31. As illustrated, the back side of the flange 31 including the O-ring 33 sealingly interfaces with the aircraft skin 15 while the outer or front side (e.g., exposed side) of the head portion 25 of the poppet valve 12 is disposed proud of the aircraft skin 15.

The movable component 18 is movable relative to the valve body 19 and has a head portion 35 that includes a receptacle 14 for opening and closing the poppet valve 12. As will be discussed in further detail below, the head portion 25 of the valve body 19 has a circular opening 20 that is surrounded by the flange 31. The receptacle 14 is disposed in the circular opening 20, exposed and accessible to the fuel drain engagement tool 10 that engages the receptacle 14 for actuating the poppet valve 12. An O-ring 37 is circumferentially disposed on and about the movable component 18 sealingly interfacing with the head portion 25 of the valve body 19 to prevent fuel from the fuel tank 11 from leaking between the valve body 19 and the movable component 18. The movable component 18 also has tabs 39 that extend radially outward from the distal end portion of the movable component 18.

The receptacle 14 has, for example, a negative feature configured to receive a positive feature(s) from a driver head (e.g., screwdriver head), such as, for example, a slot drive, cross, Philips, Frierson, or a tri-point screw head. In an exemplary embodiment, the receptacle 14 is configured as a Phillips screw head receptacle.

In an exemplary embodiment, when the head portion 35 of the movable component 18 is substantially flush with the head portion 25 of the valve body 19, the poppet valve 12 is in a closed position 41 preventing fuel from the fuel tank 11 from exiting through the poppet valve 12. The biasing element 21 is disposed within the tubular portion 27 of the valve body 19 surrounding and engaging with an intermediate portion of the movable component 18 to bias the poppet valve 12 in the closed position 41. As will be discussed in further detail below, when the poppet valve 12 is in the closed position 41 and the fuel drain engagement tool 10 is used to push or otherwise translate the movable component 18 in a direction (indicated by single headed arrow 45), the poppet valve 12 is moved to an open position 43. When the poppet valve 12 is in the open position 43, the head portion 35 of the movable component 18 is recessed relative to the head portion 25 of the valve body 19 such that the openings 49 of the tubular portion 27 of the valve body 19 are in fluid communication with the circular opening 20 to drain fuel, condensates, and/or contaminants/deposits from the fuel tank cavity 17 through the circular opening 20.

Figure 5:
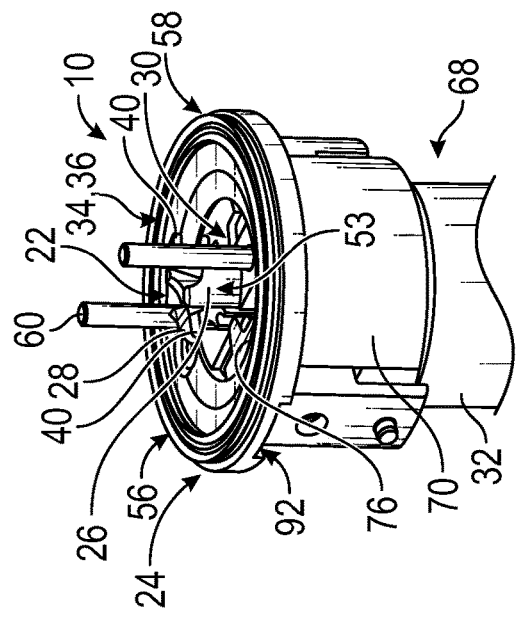
FIG. 5 illustrates a side perspective view of an upper end of the fuel drain engagement tool including a fuel engagement mechanism in an expanded state in accordance with an exemplary embodiment.
Figure 6:
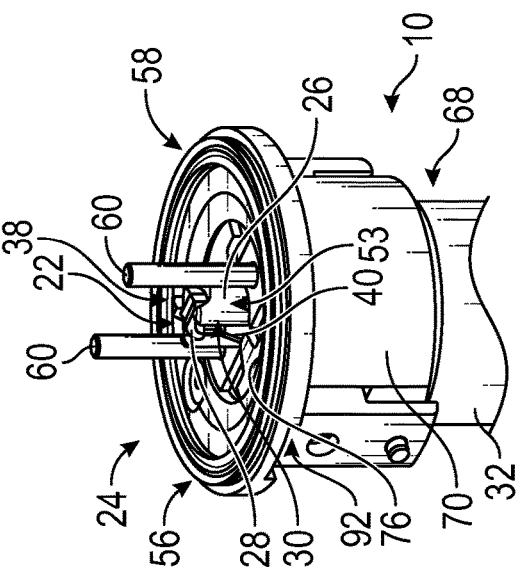
FIG. 6 illustrates a side perspective view of the upper end of the fuel drain engagement tool including the fuel engagement mechanism in a contracted state in accordance with an exemplary embodiment.
Figure 4:
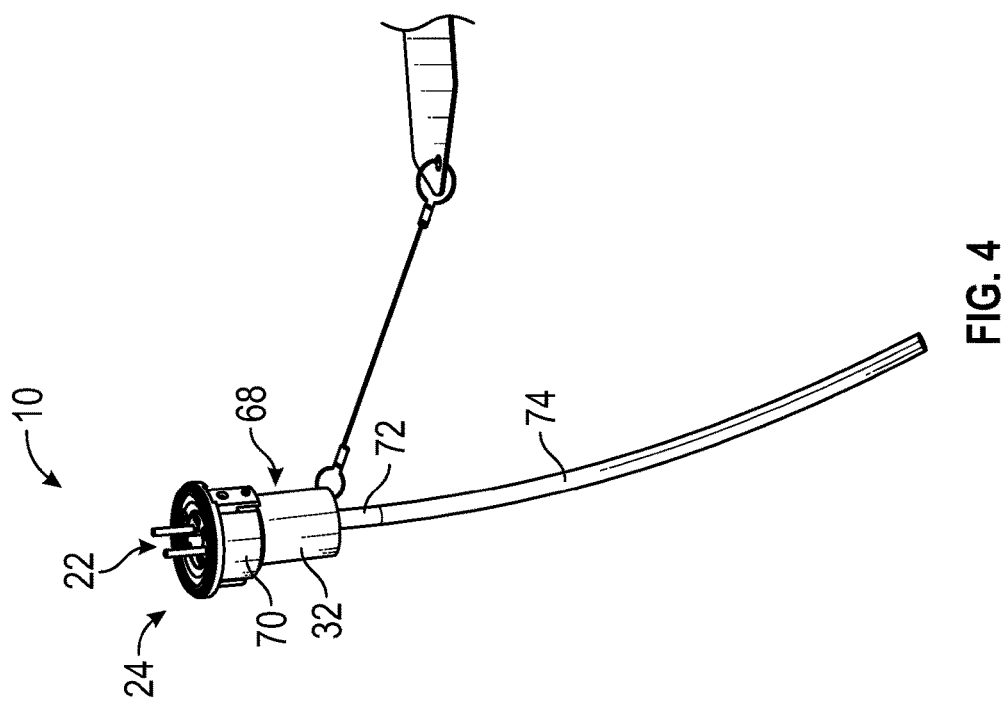
FIG. 4 illustrates a side perspective view of a fuel drain engagement tool in accordance with an exemplary embodiment.

Referring to FIGS. 4-6, as illustrated, the fuel drain engagement tool 10 is a cylindrical tool that includes a housing 68 and an engagement mechanism 22 located at an upper end 24 of the fuel drain engagement tool 10 and coupled with the housing 68 extending distally therefrom. The housing 68 includes a base portion 32 and a cylindrical shell portion 70 that surrounds at least a portion (e.g., upper section) of the base portion 32. In an exemplary embodiment, the fuel drain engagement tool 10 further includes a hollowed neck portion 72 that is coupled to the housing 68 and extends distally therefrom (e.g., extends distally from the lower section of the base portion 32). Tubing 74 or the like may be coupled to the hollowed neck portion 72 to, for example, direct fuel, condensates, and/or contaminants/deposits out through the hollowed neck portion 72 as will be discussed in further detail below.

In the illustrated embodiment, the engagement mechanism 22 includes two pairs of oppositely disposed legs 26 and 28, respectively. A first pair of oppositely disposed legs 26 remain fixed at all times. A second other pair of oppositely disposed legs 28 are each configured to pivot about a pivot point 30 proximate the base portion 32 of the fuel drain engagement tool 10. Each leg of the second pair of oppositely disposed legs 28 are biased towards an angled orientation 34 as shown in FIG. 5 and as will be discussed in further detail below. When the second pair of oppositely disposed legs 28 reside in the angled orientation 34, the engagement mechanism 22 is disposed in an expanded state 36. When the second pair of oppositely disposed legs 28 are compressed towards one another and have pivoted to an orientation that is aligned with the first pair of oppositely disposed legs 26 as shown in FIG. 6, the engagement mechanism 22 is in a contracted state 38.

When the engagement mechanism 22 is in the contracted state 38, the engagement mechanism 22 has an outer diameter that permits it to fit within the circular opening 20 surrounding the receptacle 14 on the poppet valve 12. When pushed into the circular opening 20 while in the contracted state 38, the engagement mechanism 22 will engage and push the movable component 18 in the direction 45 from the closed position 41 to the opened position 43.

Figure 7:
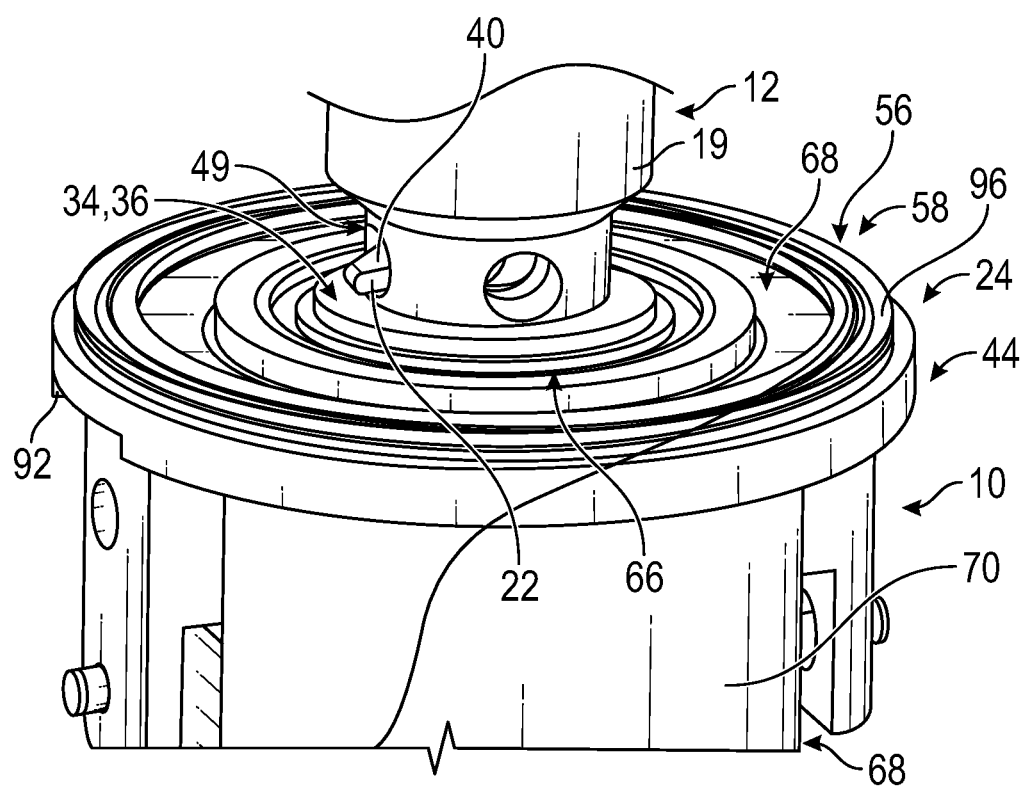
FIG. 7 illustrates a side perspective view of the fuel drain engagement tool retained in the poppet valve in accordance with an exemplary embodiment.

Once the engagement mechanism 22 is disposed within the circular opening 20 and the movable component 18 has been moved to the opened position 43, the engagement mechanism 22 can be moved to the expanded state 36. When the engagement mechanism 22 moves to the expanded state 36, the second pair of oppositely disposed legs 28 return to their angled orientation 34. Each leg of the second pair of oppositely disposed legs 28 have a hooked end portion 40 that extends outward at a transverse angle from the remaining portion of each leg 28. Referring also to FIG. 7, this hooked end portion 40 of each leg of the second pair of oppositely disposed legs 28 is configured to engage with the openings 49 of the poppet valve 12. For example, the hooked end portion 40 of each leg of the second pair of oppositely disposed legs is extends through a respective opening 49 of the poppet valve 12 when the fuel drain engagement tool 10 has pushed the poppet valve 12 to the opened position 43 and the engagement mechanism 22 is in the expanded state 36. As such, once the hooked end portion 40 of each leg of the second pair of oppositely disposed legs 28 is engaged with a respective opening 49 of the poppet valve 12, the engagement mechanism 22 of the fuel drain engagement tool 10 will both press the movable component 18 in the opened position 43 and will retain the movable component 18 in the opened position 43. The movable component 18 will remain in the opened position 43 until the second pair of oppositely disposed legs 28 are compressed, the engagement mechanism 22 returns to the contracted state 38, and then the engagement mechanism 22 is removed from the circular opening 20 and disengaged from the poppet valve 12.

In an exemplary embodiment, the first pair of oppositely disposed legs 26 each includes a concave portion 53. The concave portion 53 prevents the legs of the first pair of oppositely disposed legs 26 from obstructing the adjacent openings 49. This allows the contents of the fuel tank cavity 17 to drain more efficiently through the openings 49 when the engagement mechanism 22 is retained in the openings 49.

Figure 8:
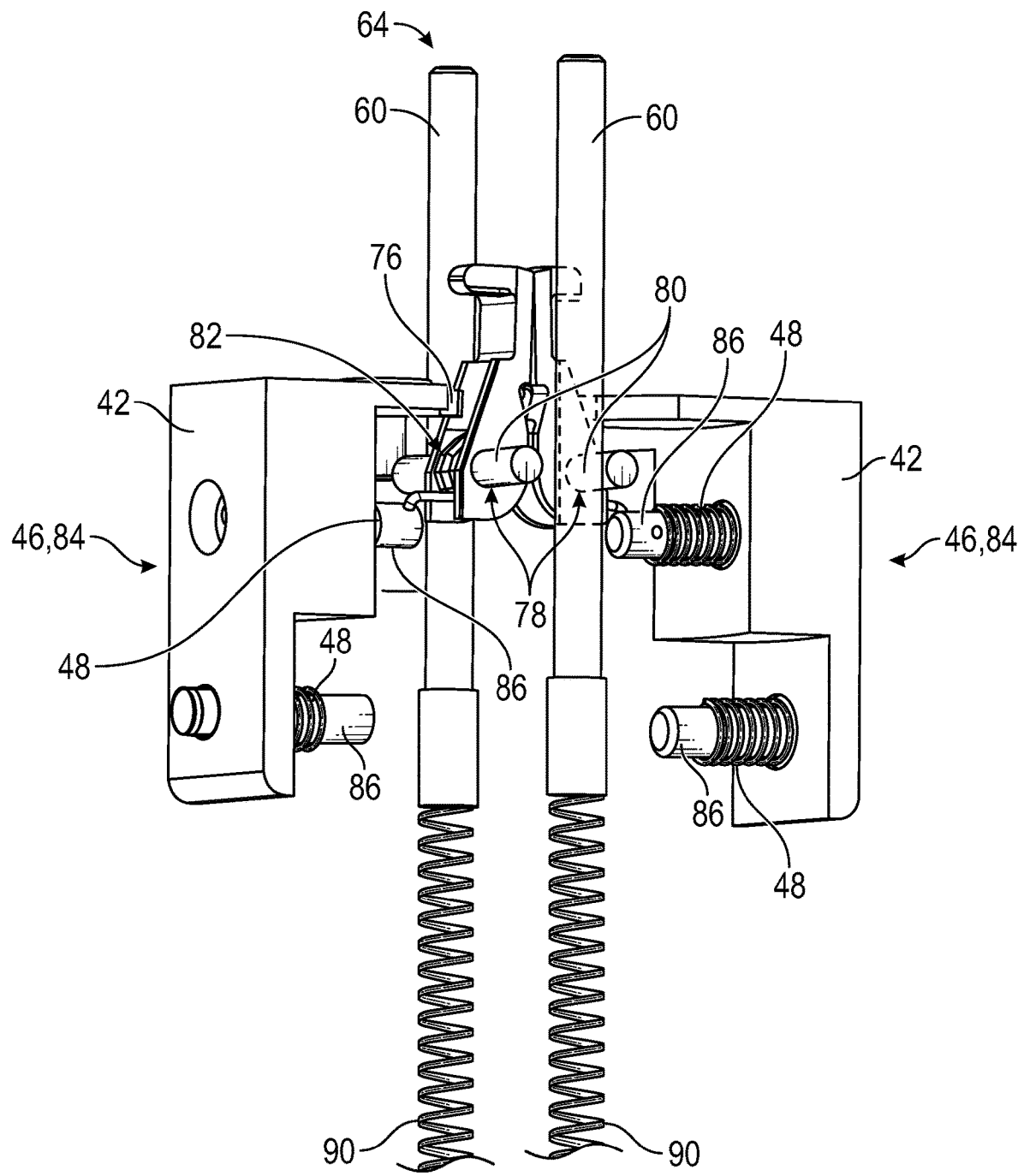
FIG. 8 illustrates a perspective side view of a portion of the fuel drain engagement tool in accordance with an exemplary embodiment.
Figure 9:
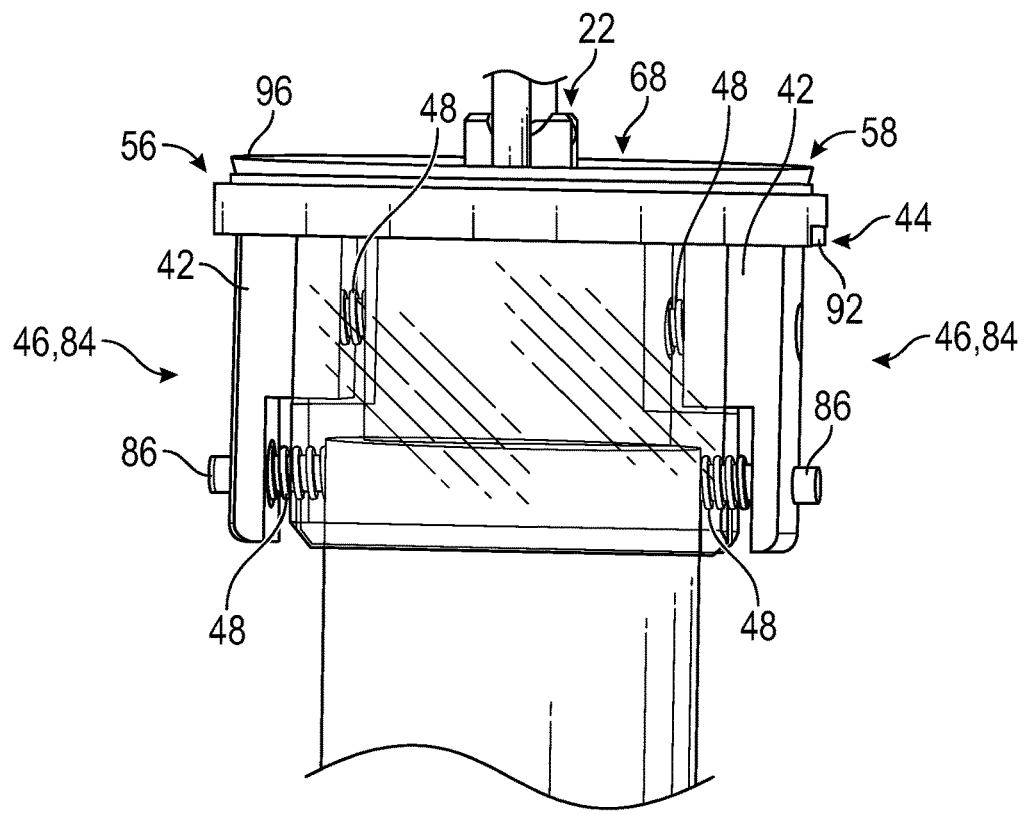
FIG. 9 illustrates a side view of the fuel drain engagement tool having a transparent cylindrical shell portion in accordance with an exemplary embodiment.

Referring also to FIGS. 8 and 9, the fuel drain engagement tool 10 includes a pair of compression applicators 42 (e.g., push buttons, actuators, or the like) that are moveably coupled with the housing 68 disposed on opposite sides of an outer periphery 44 of the fuel drain engagement tool 10. These compression applicators 42 are configured to apply a compression force (indicated by single-headed arrows 46) to the second pair of oppositely disposed legs 28 when the compression applicators 42 are depressed or otherwise actuated. In particular, each compression applicator 42 extends inwardly towards a respective leg of the oppositely disposed legs 28 to define a tip end portion 76 substantially aligned with the legs of the second pair of oppositely disposed legs 28. Each leg of the second pair of oppositely disposed legs 28 includes a hole 78 formed therethrough and a pin 80 is disposed in each hole 78 to couple the legs 28 to the housing 68. Biasing elements 82 are disposed about the pins 80 and coupled to the legs of the second pair of oppositely disposed legs 28 and to the housing 68 to bias the oppositely disposed legs 28 in the angled orientation 34. In an exemplary embodiment, the biasing elements 82 are torsion springs or the like.

When the compression force 46 is applied to the compression applicators 42, the compression applicators 42 move in the inward direction (indicated by single-headed arrows 84) and the tip end portions 76 press on the legs 28 and against the spring force from the biasing elements 82. As a result, the second pair of oppositely disposed legs 28 will pivot towards one another and the engagement mechanism 22 will be in the contracted state 38. When the compression force 46 is released, the second pair of oppositely disposed legs 28 will return to the angled orientation 34 as the tip end portions 76 of the compression applicators 42 move outwardly due to the urging of one or more biasing members 48 and likewise, the legs 28 pivot away from each other due to the spring force from the biasing elements 82 and the engagement mechanism 22 will be in the expanded state. In an exemplary embodiment, the one or more biasing members 48 are coil springs that are disposed correspondingly about pins 86 that couple the compression applicators 42 to the housing 68 to bias the compression applicators 42 outwardly in directions away from the legs 28. As such, to depress the compression applicators 42, the compression force 46 must meet and/or exceed a predetermined threshold needed to overcome the bias or spring force of the one or more biasing members 48 in order to move the compression applicators 42 in the direction 84 and position the oppositely disposed legs 28 in the contracted state 38.

An operator may apply the compression force 46 to the compression applicators 42 using their fingers. In this manner, an operator may simply squeeze the compression applicators 42 together, insert the engagement mechanism 22 into the circular opening 20, push on the movable component 18 to move the movable component 18 to the opened position 43, and then release the compression applicators 42. This sequence of actions will cause the fuel drain engagement tool 10 to engage the poppet valve 12, to move the movable component 18 to the opened position 43 and to retain the movable component 18 in the opened position 43 to drain fuel from the fuel tank 11. Once the fuel has been drained from the fuel tank 11, the operator can once again apply the compression force 46 to the compression applicators 42, pull down on the fuel drain engagement tool 10 to remove the engagement mechanism 22 from the circular opening 20 and allow the movable component 18 to return to the closed position 41.

Figure 10:
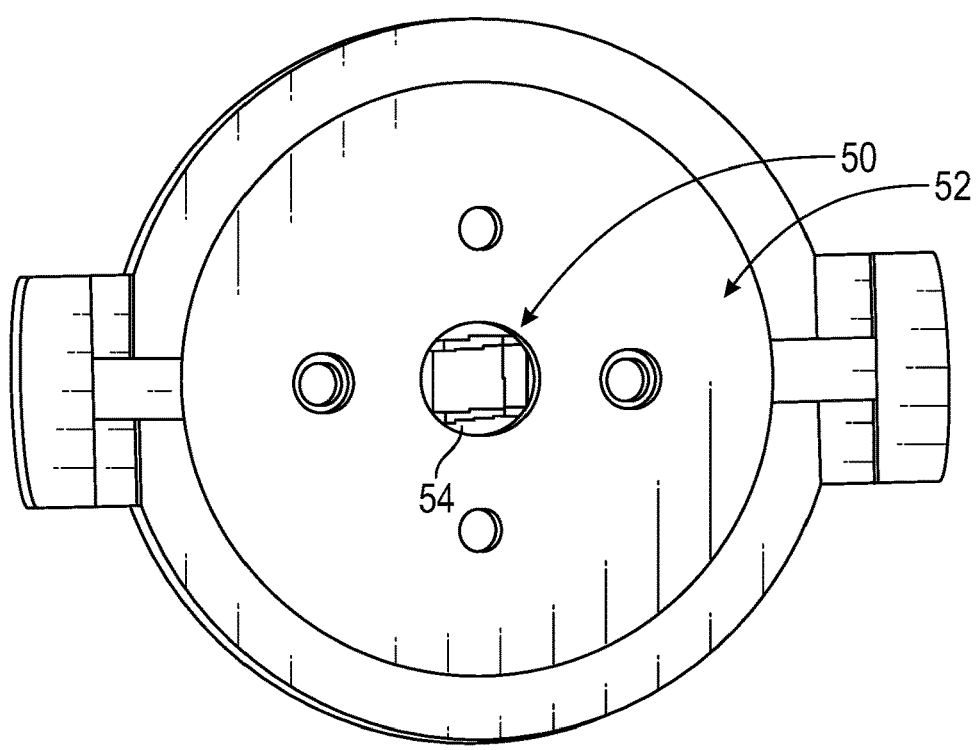
FIG. 10 illustrates a bottom view of the fuel drain engagement tool in accordance with an exemplary embodiment.

Referring also to FIG. 10, an opening 50 in the center of the underside 52 of the fuel drain engagement tool 10 is shown. In an exemplary embodiment, the opening 50 is formed through the hollowed neck portion 72 of the fuel drain engagement tool 10. The contents of the fuel tank 11 drain through the opening 50 when the fuel drain engagement tool 10 is retained in the openings 49 of the poppet valve 12. This is made possible by a cavity 54 extending through a central portion of the fuel drain engagement tool 10. The cavity 54 extends through the engagement mechanism 22. As such, the contents of the fuel tank 11 drain from the fuel tank 11 through the openings 51, the openings 49, the cavity 54, and out through the opening 50. In an exemplary embodiment, the opening 50 is in fluid communication with the tubing 74 to direct the contents of the fuel tank 11 out through the tubing 74.

Figure 12:
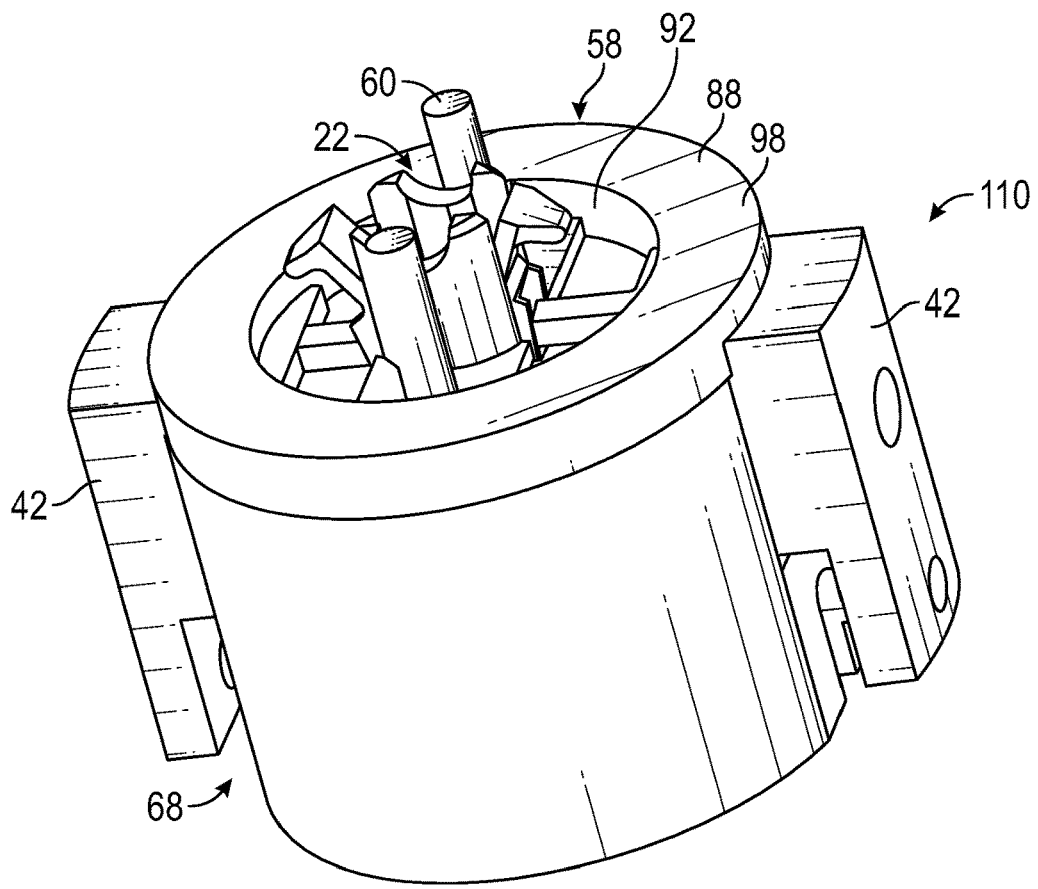
FIG. 12 illustrates a perspective view of a fuel drain engagement tool in accordance with an exemplary embodiment.
Figure 13:
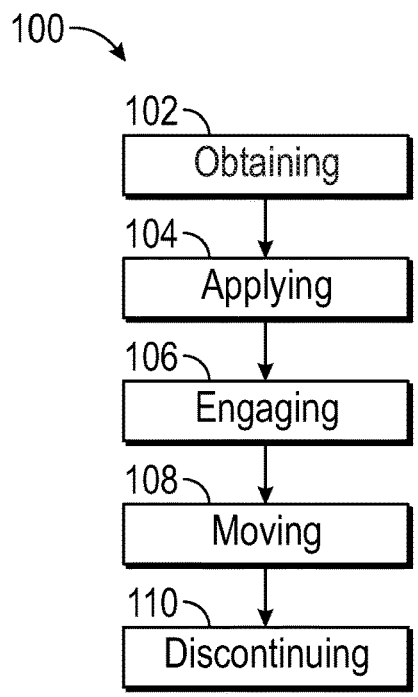
FIG. 13 illustrates a block diagram of a method for draining fuel from a fuel tank in accordance with an exemplary embodiment.

To ensure that the fuel is funneled through the opening 50 in the engagement mechanism 22, a gasket 56 is provided to obstruct the flow of fuel over the periphery edge 58 of the fuel drain engagement tool 10. As illustrated, the gasket 56 is an annular rib configuration 96 that extends upwardly from the upper portion of the housing 68 to sealingly interface with the aircraft skin 15. In the embodiment depicted herein, the gasket 56 is configured with cut-outs 92 to permit the inward and outward motion of the compression applicators 42. Referring to FIG. 12, an alternate embodiment of the fuel drain engagement tool 110 that is similarly configured to the fuel drain engagement tool 10 except the fuel drain engagement tool 110 has a gasket 88 that is provided to obstruct the flow of fuel over the periphery edge 58 of the fuel drain engagement tool 110. In particular, the gasket 88 is similarly configured to the gasket 56 but has an annular flat upper surface 98 without the annular rib configuration 96. The annular flat upper surface 98 is configured to sealingly interface with the aircraft skin 15.

Figure 11:
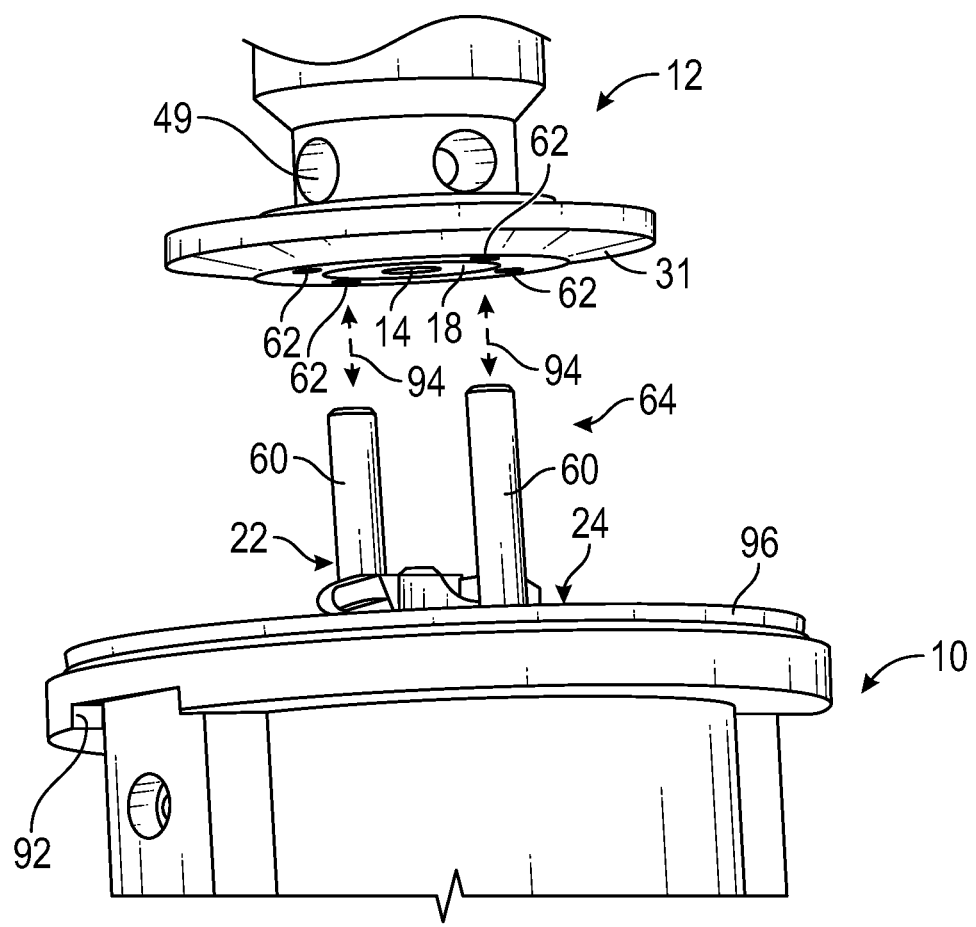
FIG. 11 illustrates a side perspective view of the poppet valve in alignment with the fuel engagement mechanism of the fuel drain engagement tool prior to engagement in accordance with an exemplary embodiment.

Referring also to FIG. 11, a pair of rods 60 project distally outward from the upper end 24 of the fuel drain engagement tool 10 where the engagement mechanism 22 is located. These rods 60 facilitate the alignment of the fuel drain engagement tool 10 with the poppet valve 12. As illustrated in FIG. 3, there are four holes 62 positioned around the outside of the circular opening 20. The pair of rods 60 are configured to fit within two oppositely disposed holes of the four holes 62. When the pair of rods 60 are inserted into two oppositely disposed holes of the four holes 62, the second pair of oppositely disposed legs 28 of the engagement mechanism 22 will be in alignment with oppositely disposed holes 49 of the poppet valve 12, (there are four holes 62 disposed around the poppet valve 12, each hole 62 being oriented ninety degrees from each neighboring hole 62 around the periphery of the poppet valve 12 and substantially aligned with the four holes 49 in the poppet valve 12).

In addition to assisting with the alignment of the fuel drain engagement tool 10, the pair of rods 60 are each further configured to move fore and aft between an extended position 64 and a retracted position 66 along an axis 94 parallel with the longitudinal axis of the fuel drain engagement tool 10. The rods 60 are biased towards the extended position 64 by biasing members 90 (e.g., coil springs) and as the rods 60 are inserted into the holes 62 surrounding the circular opening 20, and as the engagement mechanism 22 is pushed into engagement with the poppet valve 12 by the operator, the rods 60 will begin to move back towards the retracted position 66. When the rods 60 reach the retracted position 66, they will bottom out on an internal surface of the fuel drain engagement tool 10 and obstruct any further movement of the fuel drain engagement tool 10 towards the aircraft. Configured in this manner, the rods 60, when compressed to the retracted position 66, ensure that the engagement mechanism 22 does not push the movable component 18 of the poppet valve 12 beyond the opened position 43. This limitation will inhibit the fuel drain engagement tool 10 from damaging the poppet valve 12. When the fuel drain engagement tool 10 is removed from the poppet valve 12, the biasing members 90 bias the rods 60 from the retracted position 66 to the extended position 64.

FIG. 12 illustrates a method 100 for draining fuel from a fuel tank in accordance with an exemplary embodiment. The method 100 includes obtaining (STEP 102) a fuel drain engagement tool including a housing, an engagement mechanism coupled with the housing and extending upward therefrom. The engagement mechanism is configured to engage a fuel drain valve. The engagement mechanism is further configured to move between a contracted state and an expanded state. A compression applicator is coupled with the housing and positioned to engage the engagement mechanism when the compression applicator is compressed. The compression applicator is configured to apply a force to the engagement mechanism that causes the engagement mechanism to move from the expanded state to the contracted state when the compression applicator is compressed.

A compression force is applied (STEP 104) to the compression applicator to move the engagement mechanism to the contracted state. The fuel drain valve of the fuel tank is engaged (STEP 106) with the fuel drain engagement tool while continuing to apply the force to the compression applicator.

A movable component on the fuel drain valve is moved (STEP 108) from a closed position to an opened position with the engagement mechanism of the fuel drain engagement tool while continuing to apply the compression force to the compression applicator. Application of the compression force to the compression applicator is discontinued (STEP 110) when the movable component has moved to the opened position and the fuel drain engagement tool is released such that the fuel drain engagement tool remains engaged with the fuel drain valve and maintains the movable component in the opened position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A fuel drain engagement tool comprising:
   a housing;
   an engagement mechanism coupled with the housing and extending upward therefrom, the engagement mechanism configured to engage a fuel drain valve, the engagement mechanism further configured to move between a contracted state and an expanded state; and
   a compression applicator coupled with the housing and positioned to engage the engagement mechanism when the compression applicator is compressed, the compression applicator configured to apply a force to the engagement mechanism that causes the engagement mechanism to move from the expanded state to the contracted state when the compression applicator is compressed,
   wherein the engagement mechanism includes a first pair of oppositely disposed legs that are configured to move between an angled orientation and an aligned orientation, and
   wherein the fuel drain engagement tool further includes a first rod coupled with the housing and extending upward therefrom, wherein the first rod is configured to align with and engage a first alignment hole of the fuel drain valve as the engagement mechanism engages the fuel drain valve.

2. The fuel drain engagement tool of claim 1, wherein the angled orientation corresponds to the expanded state and the aligned orientation corresponds to the contracted state.

3. The fuel drain engagement tool of claim 2, wherein the fuel drain engagement tool has a longitudinal axis, wherein when the first pair of oppositely disposed legs are in the angled orientation the first pair of oppositely disposed legs are skewed relative to the longitudinal axis, and wherein when the first pair of oppositely disposed legs are in the aligned orientation the first pair of oppositely disposed legs are substantially parallel to the longitudinal axis.

4. The fuel drain engagement tool of claim 3, wherein each leg of the first pair of oppositely disposed legs has a hooked end portion that extends outward at a transverse angle from a remaining portion of the leg.

5. The fuel drain engagement tool of claim 4, wherein the fuel drain engagement tool further includes a first pair of biasing elements associated with the first pair of oppositely disposed legs and configured to bias the first pair of oppositely disposed legs towards the angled orientation.

6. The fuel drain engagement tool of claim 5, wherein the fuel drain engagement tool further includes a first pair of pins that are coupled to the first pair of oppositely disposed legs and the housing, and wherein the first pair of biasing elements are disposed about the first pair of pins.

7. The fuel drain engagement tool of claim 6, wherein the first pair of biasing elements are torsion springs.

8. The fuel drain engagement tool of claim 7, wherein the compression applicator extends toward the first pair of oppositely disposed legs to define a pair of tip end portions that are substantially aligned with the first pair of oppositely disposed legs, and wherein when the compression applicator applies the force, the pair of tip end portions move the first pair of oppositely disposed legs towards the aligned orientation.

9. The fuel drain engagement tool of claim 8, wherein the compression applicator is configured to move between a compressing position and a non-compressing position, wherein the compression applicator applies the force to the engagement mechanism when the compression applicator is moved towards the compressing position, wherein the compression applicator does not apply the force to the engagement mechanism when the compression applicator is in the non-compressing position, wherein the fuel drain engagement tool further includes a biasing member associated with the compression applicator, and wherein the biasing member is configured to bias the compression applicator towards the non-compressing position.

10. The fuel drain engagement tool of claim 9, further comprising an additional compression applicator that together with the compression applicator form a pair of oppositely disposed compression applicators that are substantially aligned with the first pair of oppositely disposed legs.

11. The fuel drain engagement tool of claim 10, wherein the engagement mechanism further includes a second pair of oppositely disposed legs that are coupled to the housing and extend upward therefrom, wherein the second pair of oppositely disposed legs are fixedly positioned relative to the housing.

12. The fuel drain engagement tool of claim 11, wherein each leg of the second pair of oppositely disposed legs extend upward from the housing to define concave distal end portions.

13. The fuel drain engagement tool of claim 1, wherein the fuel drain engagement tool further comprises a second rod coupled with the housing and extending upward therefrom, and wherein the second rod is configured to align with and engage a second alignment hole of the fuel drain valve as the engagement mechanism engages the fuel drain valve.

14. The fuel drain engagement tool of claim 1, wherein the first rod is configured to move fore and aft along an axis parallel with a longitudinal axis of the fuel drain engagement tool between an extended position and a retracted position, and wherein the first rod limits movement of the engagement mechanism into the fuel drain valve when the first rod reaches the retracted position.

15. The fuel drain engagement tool of claim 14, wherein the fuel drain engagement tool further includes a biasing element that is associated with the first rod and is configured to bias the first rod towards the extended position.

16. The fuel drain engagement tool of claim 1, wherein the fuel drain engagement tool has a central portion and a cavity extending through the central portion.

17. The fuel drain engagement tool of claim 16, wherein the fuel drain engagement tool further includes a hollowed neck portion that has an opening in fluid communication with the cavity and that extends downward from the housing.

18. The fuel drain engagement tool of claim 1, wherein the fuel drain engagement tool further includes a gasket that surrounds at least a portion of the engagement mechanism and is disposed on the housing and that is configured to obstruct flow of fuel over a periphery edge of the fuel drain engagement tool.

19. A method for draining fuel from a fuel tank, the method comprising the steps of:

obtaining a fuel drain engagement tool comprising a housing, an engagement mechanism coupled with the housing and extending upward therefrom, the engagement mechanism configured to engage a fuel drain valve, the engagement mechanism further configured to move between a contracted state and an expanded state and a compression applicator coupled with the housing and positioned to engage the engagement mechanism when the compression applicator is compressed, the compression applicator configured to apply a force to the engagement mechanism that causes the engagement mechanism to move from the expanded state to the contracted state when the compression applicator is compressed;

applying a compression force to the compression applicator to move the engagement mechanism to the contracted state;

engaging the fuel drain valve of the fuel tank with the fuel drain engagement tool while continuing to apply the compression force to the compression applicator;

moving a movable component on the fuel drain valve from a closed position to an opened position with the engagement mechanism of the fuel drain engagement tool while continuing to apply the compression force to the compression applicator; and discontinuing application of the compression force to the compression applicator when the movable component has moved to the opened position and releasing the fuel drain engagement tool, such that the fuel drain engagement tool remains engaged with the fuel drain valve and maintains the movable component in the opened position.

* * * * *